United States Patent [19]

Paolasini

[11] 4,277,376

[45] Jul. 7, 1981

[54] PROCESS FOR THE MANUFACTURE OF A MONOLITHIC SUPPORT FOR CATALYSTS SUITABLE FOR USE IN CONTROLLING CARBON MONOXIDE EMISSIONS

[75] Inventor: Sergio Paolasini, Turin, Italy

[73] Assignee: Centro Ricerche Fiat S.p.A., Orbassano, Italy

[21] Appl. No.: 57,856

[22] Filed: Jul. 16, 1979

[30] Foreign Application Priority Data

Jul. 26, 1978 [IT] Italy .................................. 68778 A/78

[51] Int. Cl.³ ............................................. B01J 21/12
[52] U.S. Cl. .................................. 252/455 R; 252/463; 252/477 R; 423/626; 423/628
[58] Field of Search ............... 252/455 R, 463, 477 R; 423/626, 628

[56] References Cited

U.S. PATENT DOCUMENTS

| | | | |
|---|---|---|---|
| 3,554,929 | 1/1971 | Aarons | 252/463 X |
| 3,850,849 | 11/1974 | Kiovsky et al. | 252/463 |
| 3,856,708 | 12/1974 | Carithers | 252/463 |
| 3,912,658 | 10/1975 | Kaneko et al. | 252/455 R |
| 3,944,658 | 3/1976 | Yoldas | 423/626 |
| 4,075,125 | 2/1978 | Morimoto et al. | 252/455 R |
| 4,082,697 | 4/1978 | Tamm | 252/463 X |

Primary Examiner—Carl F. Dees
Attorney, Agent, or Firm—Sughrue, Rothwell, Mion, Zinn and Macpeak

[57] ABSTRACT

A monolithic support for a catalyst suitable for use in controlling carbon monoxide emission is prepared by forming a homogeneous, fluid semi-solid mass by admixing colloidal γ alumina, α alumina monohydrate and ceramic fibres with fluidizing and binding agents, water and a mineral acid, said acid being used in an amount sufficient to convert said α $Al_2O_3$ monohydrate into a gel, forming the mass into a body of the desired shape, drying the body to substantially remove the added water, at least 10% of said added water being removed at a temperature lower than 50° C., and heat-treating the dried body at 800°–1000° C.

22 Claims, No Drawings

PROCESS FOR THE MANUFACTURE OF A MONOLITHIC SUPPORT FOR CATALYSTS SUITABLE FOR USE IN CONTROLLING CARBON MONOXIDE EMISSIONS

The present invention relates to a process for the manufacture of a monolithic support for a catalyst particularly suitable for use in controlling carbon monoxide emissions.

As is known, carbon monoxide forms when organic substances are subjected to incomplete combustion. The levels of carbon monoxide in the combustion gases can be significantly reduced by passing said gases through a suitable catalyst bed. The catalytic system generally comprises a catalyst, such as platinum, palladium, copper chromite or nickel oxide, applied to a high surface area material such as the transition aluminas. The high surface area material can be used by itself, usually in the form of granules. However, the general trend in the art of catalyst supports for controlling carbon monoxide emissions is to coat the high surface area material onto a honeycomb-type monolith.

Reference is made in this connection to "Multicellular ceramics as catalyst supports for controlling automotive emissions," R. D. Bagley, R. C. Doman, D. N. Duke and R. N. McNally, Society of Automotive Engineers, N.Y., 730274, 1973.

Multicellular ceramic bodies have in fact several characteristics, such as smaller size, lower back pressure and lower vibration attrition, which make them suitable as catalyst supports for controlling carbon monoxide emissions. The multicellular substrate is generally formed by stacking glass tubes and fusing the bundle into a monolith, or by alternate stacking of flat and corrugated sheets and extrusion. The ceramic material is generally a cordierite or a cordierite-mullite composition. The high surface area material is then coated onto the ceramic substrate as a slurry or slip.

By using the above method, it is however difficult to obtain a monolithic substrate having simultaneously good mechanical properties, such as thermal slock resistance, and good coating pickup and adherence between coating and substrate.

An object of the present invention is to provide a process for the manufacture of a monolithic support with good mechanical properties, and especially of resistance to thermal shock and attrition, which is able to serve both as a rigid and porous support for a catalyst and as the high surface area material.

Thus, the present invention provides a process for the manufacture of a monolithic support for a catalyst suitable for use in controlling carbon monoxide emissions, characterized by forming a homogeneous, fluid semi-solid mass by admixing a solid mixture comprising colloidal $\gamma$ alumina, $\alpha$ alumina monohydrate and ceramic fibres with one or more fluidising and binding agents for said mixture, water and a mineral acid, said acid being used in an amount sufficient to convert said $\alpha Al_2O_3$ monohydrate into a gel, forming said mass into a body of the desired shape and provided with continuous channels, drying the said body to substantially remove the added water, at least 10% of said added water being gradually removed at a temperature lower than 50° C., and heat-treating the dried body at a temperature of from 800° to 1000° C. to impart strength and porosity to the body.

More particularly, the process of the invention is based on the use of a particular solid mixture which is admixed with suitable additives permitting its conversion into a fluid semi-solid mass which can be formed into a body of the desired shape and having sufficient consistency.

The solid mixture comprises as essential ingredients $\alpha Al_2O_3.H_2O$, colloidal $\gamma$ alumina and ceramic fibres. It has been experimentally ascertained that the use of other types of aluminas, such as $Al_2O_3.3H_2O$, in lieu of $\alpha\ Al_2O_3.H_2O$ do not permit satisfactory results to be obtained, most probably on account of the excessively high content of water of crystallization. The use of a mixture of two aluminas is also an essential feature of the process of the invention. When using colloidal $\gamma$ alumina alone, unsatisfactory homogeneity of the mass would be obtained. On the other hand, the use of $\alpha Al_2O_3.H_2O$ alone does not permit a product of satisfactory properties to be obtained. Satisfactory results are generally achieved with a mixture of aluminas containing from 40 to 60 wt.%, and preferably 50 wt.% of $\alpha.Al_2O_3.H_2O$. The particle size of the $\alpha$ alumina is generally from 1 to 100 microns, and preferably from 1 to 20 microns. The $\gamma$ alumina is generally in the form of particles with a size not exceeding 1 micron, and preferably not exceeding 0.1 microns, best results being generally obtained with sizes of from 0.01 to 0.1 micron. The aluminas should preferably have a surface area of at least 50 m$^2$/g, and still preferably of at least 100 m$^2$/g.

The ceramic fibres are added to the mixture of aluminas in order to impart satisfactory mechanical properties to the support. These fibres may be chosen from among the various materials capable of withstanding temperatures of 800°–100° C. without any substantial reduction in mechanical properties. Generally aluminosilicates, which are readily available and low cost, are used for the purpose. The fibres are generally used in amounts of at least 1% and preferably about 3% by weight with respect to the mixture of aluminas, to impart sufficient mechanical properties to the support. On the other hand, when using the fibres in amounts exceeding 8–10% by weight with respect to the mixture of aluminas, it is generally difficult to achieve a homogeneous dispersion of said fibres in the mass.

According to the process of the invention, the solid mixture is admixed with suitable fluidising and binding agents, water and a mineral acid to obtain the desired plastic mass. In particular, the fluidising and binding agents may be chosen from among the various product used for the purpose in the art of ceramics and should preferably from a solution or dispersion with water. These agents should also preferably be stable under the drying conditions of the process of the invention and decompose only under the heat-treatment conditions. Examples of suitable fluidising and binding agents are carboxymethyl cellulose, methyl cellulose, alginates, polyvinyl alcohol and glycols, best results being generally obtained with carboxymethyl cellulose. The said agents are generally used in amounts not exceeding 5–10 wt.% and preferably of from 0.5 to 3 wt.% with respect to the said solid mixture. The water is added in amounts sufficient to obtain a homogeneous mass of the desired fluidity, and generally in amounts of from 1 to 1.3 times, preferably 1.1 times, the weight of the said solid mixture.

A mineral acid, preferably hydrochloric acid, is also added to convert into a gel the $\alpha$ alumina. In practice, the amount of added acid should be such as to bring the pH to a value of the order of 2–3, to obtain the desired gel formation. By way of example, when using a commercial HCl aqueous solution (37%), the amount of HCl solution is generally from 0.2 to 0.4 wt.% with respect to the said solid mixture.

In practice, the semi-solid mass may be prepared by mixing the fluidising agents with the water, adding to the resulting liquid mixture the $\alpha Al_2O_3.H_2O$, adding then the acid to obtain the desired gel formation, and adding the other components of the solid mixture, although it is also possible to add in a single step the whole of the solid mixture to said liquid mixture. The whole is then thoroughly homogenized in a kneading machine.

The fluid semi-solid mass is then formed into a body of the desired shape provided with continuous channels extending throughout the body along the desired direction, to allow passage of the gases during use of the finished article. The channels may consist for example of a series of parallel through holes, having for example a mean diameter of 1–5 mm, although other shapes and arrangements may be used if desired. The mass may be formed into the desired body by using conventional methods, extrusion being generally preferred.

The shaped body is then dried to substantially remove the added water, using a two-step drying stage. In particular, the first drying step should be carried out at a temperature lower than 50° C. to remove at least 10% of the added water. It has been experimentally ascertained that a drying carried out at higher temperatures (for instance 100° C.) without any preliminary removal of a sufficient amount of water at low temperatures, brings about a noticeable worsening on the mechanical properties of the support. In practice the first drying step may be carried out at ambient temperature and for a period of time sufficient to remove from 15 to 30% of the added water, values of 20–25% being generally preferred. The upper limits of the amount of water removed at the first step are not particularly critical, and may reach 50% or even 70%, but excessively long durations would be required in such a case.

The water removal at the first step should be as gradual as possible in order not to impair the mechanical properties of the support. In practice the evaporation rate of the water may be controlled by carrying out the first drying step in a gaseous atmosphere with a high hygrometric degree, using for example a closed vessel or an impermeable cover. The duration of the first drying step is generally from 10 to 100 hours and typically from 30 to 50 hours.

The drying is then completed at a temperature of at least 50° C. and generally not exceeding 200° C., values of the order of 100° C. being generally preferred. The duration of the second drying step is typically of the order of 8–10 hours.

The dried body is then submitted to a final heat-treatment at 800°–1000° C., preferably 900° C., to convert the $\alpha$ alumina into an activate transition alumina and impart satisfactory strength and porosity to the body. The body should preferably be brought gradually to the heat-treatment temperature, using a rate of increase of the temperature lower than 300° C./hr. When using heat-treatment temperatures higher than 1000° C., the material is generally unfit for use as a catalyst support. On the other hand, temperatures lower than 800° C. are generally insufficient to yield a support of satisfactory mechanical properties. The heat-treatment may be carried in air and for a period of from 0.5 to 5 hours, periods of about 1 hour being generally sufficient.

The monolithic support thus obtained has typically a surface area of from 90 to 130 m$^2$/g and an overall porosity of 0.4–0.6 cc/g, about 50% of the porosity being attributable to pores with a diameter exceeding 75 Å and up to 75,000 Å. The support thus allows good dispersion of the catalyst, and has a good capacity for retaining the catalyst and a multiplicity of active sites to allow optimum utilization of said catalyst.

The support has also satisfactory mechanical properties and in particular a good resistance to thermal shock.

The catalyst may either be deposited on the monolithic support after the thermal treatment, or may be added during the preparation of the semi-solid mass. Palladium and platinum, for example, may be added by the first method, and copper chromite and nickel oxide by the second.

EXAMPLE

A semi-solid mass is prepared from the following components: 50 parts by weight of $\alpha Al_2O_3.H_2O$, 50 parts by weight of colloidal $\gamma Al_2O_3$, 3 parts by weight of alumino-silicate fibres, 0.3 parts by weight of commercial HCl (37% strength), 2 parts by weight of carboxymethyl cellulose and 110 parts by weight of water.

In particular, the $\alpha Al_2O_3$ is a bohemite (Dispersible Alumina of the Condea Company) with a surface area of 230 m$^2$/g, a grain size of about 5 microns (about 5 millimicrons upon gelation), an apparent density of 650–750 g/l and a moisture content of 7–9 wt.%.

The $\gamma$ alumina is a colloidal alumina type C of the Degussa Company with a surface area of 100 m$^2$/g, a grain size of from 5 to 30 millimicrons, a moisture content of 5 wt.%, an apparent density of 50–60 g/l and a specific gravity of 3.40 g/cc.

The carboxy-methyl cellulose is the product known under the trade Name Culminal C 32 of the Henkel Company and the alumino-silicate fibers are produced by the Kaowool Company.

The mass is prepared by forming a 2 wt.% solution of Culminal in water, adding the $\alpha$ alumina, and the HCl solution under agitation until gelation is reached, adding then the $\gamma$ alumina and the fibers still under agitation, and adding the remaining water. The mass is then homogenised in a kneading machine.

The homogeneous mass is then extruded through a piston-type extruder to obtain an extrudate rectangular in cross-section (2.5×5 cm) with 125 internal channels about 1 mm in diameter. The extrudate is cut into bodies about 2.5 cm in length. The bodies are first dried at ambient temperature for about 50 hours to remove about 20% of the added water, the rate of evaporation being controlled by using a plastics cover to maintain a high hygroscopic degree in the atmosphere surrounding the bodies.

The water removal is then completed by drying at 100° C. for 10 hours. The bodies are then heat-treated at 900° C. for 1 hour, taking care that the temperature be brought to 900° C. at a rate lower than 300° C./hr.

The material thus obtained has a surface area of 100 m$^2$/g and an overall porosity of about 50%, 50% of the porosity being attributable to pores with a diameter exceeding 75 Å. The material has also a good resistance to thermal shock. In particular no cracks are noted when the material is brought to 800° C. and then rapidly cooled to ambient temperature by means of a stream of compressed air.

We claim:

1. A process for the manufacture of a monolithic support for a catalyst suitable for use in controlling carbon monoxide emissions, characterized by forming a homogeneous, fluid semi-solid mass by admixing a solid mixture comprising colloidal $\gamma$ alumina having a grain size not exceeding 1 micron, $\alpha$ alumina monohydrate and ceramic fibres with one or more fluidising and binding agents for said mixture, water and a mineral acid, said $\alpha Al_2O_3$ monohydrate being used in an amount of from 40 to 60% by weight with respect to the total weight of the $\alpha$ and $\gamma$ aluminas and said acid being used in an amount sufficient to convert said $\alpha Al_2O_3$ monohydrate into a gel, forming said mass into a body of the desired shape and provided with continuous channels, drying said body to substantially remove the added water, at least 10% of said added water being gradually removed at a temperature lower than 50° C., and heat-treating the dried body at a temperature of from 800° to 1000° C. to impart strength and porosity to the body.

2. The process of claim 1, wherein said mineral acid is hydrochloric acid.

3. The process of claim 1, wherein said $\gamma$ alumina has a grain size not exceeding 0.1 micron.

4. The process of claim 1, wherein said $\alpha$ alumina has a grain size of from 1 to 100 microns.

5. The process of claim 1, wherein said $\alpha$ alumina has a grain size of from 1 to 20 microns.

6. The process of claim 1, wherein said $\alpha$ and $\gamma$ aluminas have a surface area of at least 50 $m^2/g$.

7. The process of claim 1, wherein said fibres are alumino-silicate fibres.

8. The process of claim 1, wherein said fibres are used in an amount of from 1 to 10% by weight with respect to the weight of said $\alpha$ and $\gamma$ aluminas.

9. The process of claim 1, wherein said fluidising and binding agents are selected from the group consisting of carboxymethyl cellulose, methyl cellulose, polyvinyl alcohol, glycols and alginates.

10. The process of claim 1, wherein said fluidising and binding agent is carboxy methyl cellulose.

11. The process of claim 1, wherein said fluidising and binding agents are used in an amount of from 0.5 to 10% by weight with respect to said solid mixture.

12. The process of claim 1, wherein said fluidising and binding agents are used in an amount of from 0.5 to 3% by weight with respect to said solid mixture.

13. The process of claim 1, wherein said water is added in an amount of 100 to 130% by weight with respect to said solid mixture.

14. The process of claim 1, wherein said mass is formed into said body by extrusion.

15. The process of claim 1, wherein said added water is removed by a two-step drying, the first step being carried out at a temperature lower than 50° C. to remove at least 10% of said water and the second step being carried out at a temperature of from 50° to 200° C.

16. The process of claim 15, wherein said first step is carried out at ambient temperature.

17. The process of claim 15, wherein from 15 to 30% of said added water is removed at said first step.

18. The process of claim 15, wherein said first step is carried out for a period of from 10 to 100 hours.

19. The process of claim 15, wherein said second step is carried out at a temperature of about 100° C.

20. The process of claim 1, wherein said heat-treatment is carried out at a temperature of about 900° C.

21. The process of claim 1, wherein said body is brought to the heat-treatment temperature at a rate lower than 300° C./hr.

22. The process of claim 1, wherein said heat-treatment is carried out for a period of from 0.5 to 5 hours.

* * * * *